(12) United States Patent
Abt et al.

(10) Patent No.: US 6,902,238 B1
(45) Date of Patent: Jun. 7, 2005

(54) PERSONAL TRANSPORTATION SEAT IN PARTICULAR FOR AIRCRAFT PASSENGERS

(75) Inventors: Guido Abt, Schwäbisch Hall (DE); Hartmut Schurg, Schwäbisch Hall (DE); Bernd Koch, Schwäbisch Hall (DE)

(73) Assignee: Recaro Aircraft Seating GmbH & Co., Schwäbisch Hall (DE)

( * ) Notice: Subject to any disclaimer, the term of this patent is extended or adjusted under 35 U.S.C. 154(b) by 0 days.

(21) Appl. No.: 10/362,453

(22) PCT Filed: Aug. 25, 2000

(86) PCT No.: PCT/EP00/08346

§ 371 (c)(1),
(2), (4) Date: Jun. 17, 2003

(87) PCT Pub. No.: WO02/16161

PCT Pub. Date: Feb. 28, 2002

(51) Int. Cl.⁷ ............................................. A47C 20/00
(52) U.S. Cl. ............................ 297/362.13; 297/423.26
(58) Field of Search ..................... 297/423.19, 423.26, 297/362.13, 362.12, 423.34, 423.35; 74/500.5, 74/82, 501.6

(56) References Cited

U.S. PATENT DOCUMENTS

| 3,150,898 | A | * | 9/1964 | Knudson .................... 297/329 |
| 4,454,390 | A | | 6/1984 | Gmeiner et al. |
| 4,695,682 | A | | 9/1987 | Winogrocki |
| 5,174,526 | A | | 12/1992 | Kanigowski |
| 5,352,020 | A | * | 10/1994 | Wade et al. ............ 297/423.26 |
| 5,613,735 | A | * | 3/1997 | Goiset .................... 297/362.13 |
| 5,743,591 | A | * | 4/1998 | Tame ....................... 297/216.1 |
| 5,868,461 | A | * | 2/1999 | Brotherston ................. 297/84 |
| 6,416,131 | B1 | * | 7/2002 | Changkeun ............ 297/344.19 |
| 6,450,580 | B1 | * | 9/2002 | Drew et al. ............ 297/378.12 |
| 6,526,643 | B1 | * | 3/2003 | Renault .................... 29/407.05 |

FOREIGN PATENT DOCUMENTS

| DE | 19728743 | 6/1998 |
| FR | 2153584 | 5/1973 |

* cited by examiner

Primary Examiner—Milton Nelson, Jr.
(74) Attorney, Agent, or Firm—Roylance, Abrams, Berdo & Goodman, L.L.P.

(57) ABSTRACT

A personal transportation seat, in particular for aircraft passengers, includes individually adjustable seat parts (3, 7). At least one seat part may be moved against a returning force, with a force reservoir (11), normally blocked by a locking device. A switch arrangement (35, 37) can move the locking device into an ineffective state to release the force reservoir (11) to generate the returning force on the movable seat part (3, 7). The switch device is a servo drive for each adjustable seat part (3, 7) for the generation of an adjusting force which renders each locking device ineffective. Each servo device is controllable by a manually displaced handle (35, 37), which is made to match the contour of the relevant seat part (3, 7) for adjustment, by virtue of its form and arrangement.

18 Claims, 4 Drawing Sheets

PERSONAL TRANSPORTATION SEAT IN PARTICULAR FOR AIRCRAFT PASSENGERS

FIELD OF THE INVENTION

The present invention relates to a seat for passenger transportation, particularly an airplane passenger seat, with individually adjustable seat parts. At least one of the seat may be moved against a restoring force, with an energy accumulator normally blocked by a locking device, and with a switching device. By the switching device, the locking device may be transferred to an inoperative state in which the energy accumulator is unblocked for generation of a restoring force acting on the movable seat part.

BACKGROUND OF THE INVENTION

U.S. Pat. No. 5,174,526 discloses an aircraft seat in which a lordosis or lumbar support is built into the backrest. That support may be moved backward by the occupant of the seat by application of a load to the backrest from the farthest protruded position against the restoring force to a position conforming to the occupant's wishes, after the occupant has moved the locking mechanism normally blocking the energy accumulator to its inoperative state. The restoring force is applied by a spring system serving as energy accumulator. The switching device provided for this purpose has a manually operated push button mounted in the side armrest of the seat. The force actuating the push button is transmitted by a Bowden wire system to the locking device as an actuating force.

The tilt of the backrest for this disclosed air passenger seat may be appropriately adjusted by the seat occupant against the restoring force of another spring system also serving as energy accumulator. The adjustment is accomplished by application of a load to the tiltable backrest, after the energy accumulator has been unlocked again by operation of another push button by an associated Bowden wire. In both cases, the seat parts involved, that is, lordosis support and tiltable backrest, are returned to the respective initial positions by the restoring force, by operation of the respective push button and by absence of the load applied by the seat occupant. The backrest is brought to the upright position, for the prescribed landing process, for example.

The improvement in seating comfort which the seat occupant is afforded by the adjustability of the adjustable seating parts is achieved at the disadvantage of correspondingly high operating expense. A relatively high actuating force to be applied by the seat occupant is required for operation of the push buttons in question and mechanical transmission of the actuating force to the respective locking device.

U.S. Pat. No. 4,454,390 discloses individual adjustment of another type of seat. Each adjustable seat part has a switching device with a servo drive. Each servo drive is controllable by a manually operated lever, the shape and position of which are based on the outline of the respective seat part to be adjusted. Consequently, the tilted position of the backrest may be adjusted in both directions by the respective servo drive. Longitudinal adjustment of the seat part proper and raising and lowering of the seat part are separately on its front side and in the area to its rear. Actuation of the associated servo drive by the hand levers is then necessary for each process of seat part movement. Each process of seat part movement requires actuation of the associated servo drive by the hand levers in question. Consequently, each process of adjusting a seat part requires manual actuation by the hand levers. It is not true that, in accordance with the solution described at the beginning, an engaging restoring force of a spring system serving as energy accumulator of itself immediately carries out an adjustment process, such as moving the backrest to the upright position prescribed for landing, after a seat occupant has executed an unlocking process. Especially in emergency situations, in which possibly little time is available for action, the disclosed solution is then of little service if it is applied to aircraft passenger seats.

SUMMARY OF THE INVENTION

Objects of the present invention are to provide a seat which affords the seat occupant the highest degree of comfort, of simplicity of operation for the devices to adjust the positions of seat parts and of safety.

In accordance with the present invention, at least one normally blocked gas-pressure spring system is provided as an energy accumulator. The system may be unlocked by a control valve operated by the respective actuating force produced to act against a return force. For emergency unlocking of this gas-pressure spring system, an actuating device is operated manually independently of the respective servo drive to transfer the locking device to the disabled or inoperative state. In the event of failure of the aircraft wiring, something which might result in disabling of the servo drives, emergency unlocking is made available. Even in the event of failure of the aircraft wiring, the movable seat parts may be transferred automatically to a specific position, such as that prescribed by the landing process, as a result of the action of the restoring force. The unlocking device already provided conventionally, a device which transmits a corresponding actuating power to the locking device by a manually operated push button and a Bowden wire system, permits transmission of an appropriate actuating force mechanically to the locking device, without use of the servo drives for otherwise customary operation of the seat.

The electric servo drive may be powered by the electrical wiring of the respective transportation means, e.g., the aircraft, and a servo drive having an electromagnet generating actuating power and activated by a control switch operated by the respective hand lever.

As an alternative, a servo drive producing actuating power hydraulically or pneumatically may be provided. A working cylinder delivers the actuating power for the unlocking process, thus, for example, operating the control valve of the respective gas operated spring system. In this instance, the lever manually operated by the seat occupant is associated with an on-off valve.

To remove the load on the seat occupant, the respective manual lever may preferably be returned to its initial position by the force of a spring after being operated by hand.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 3:
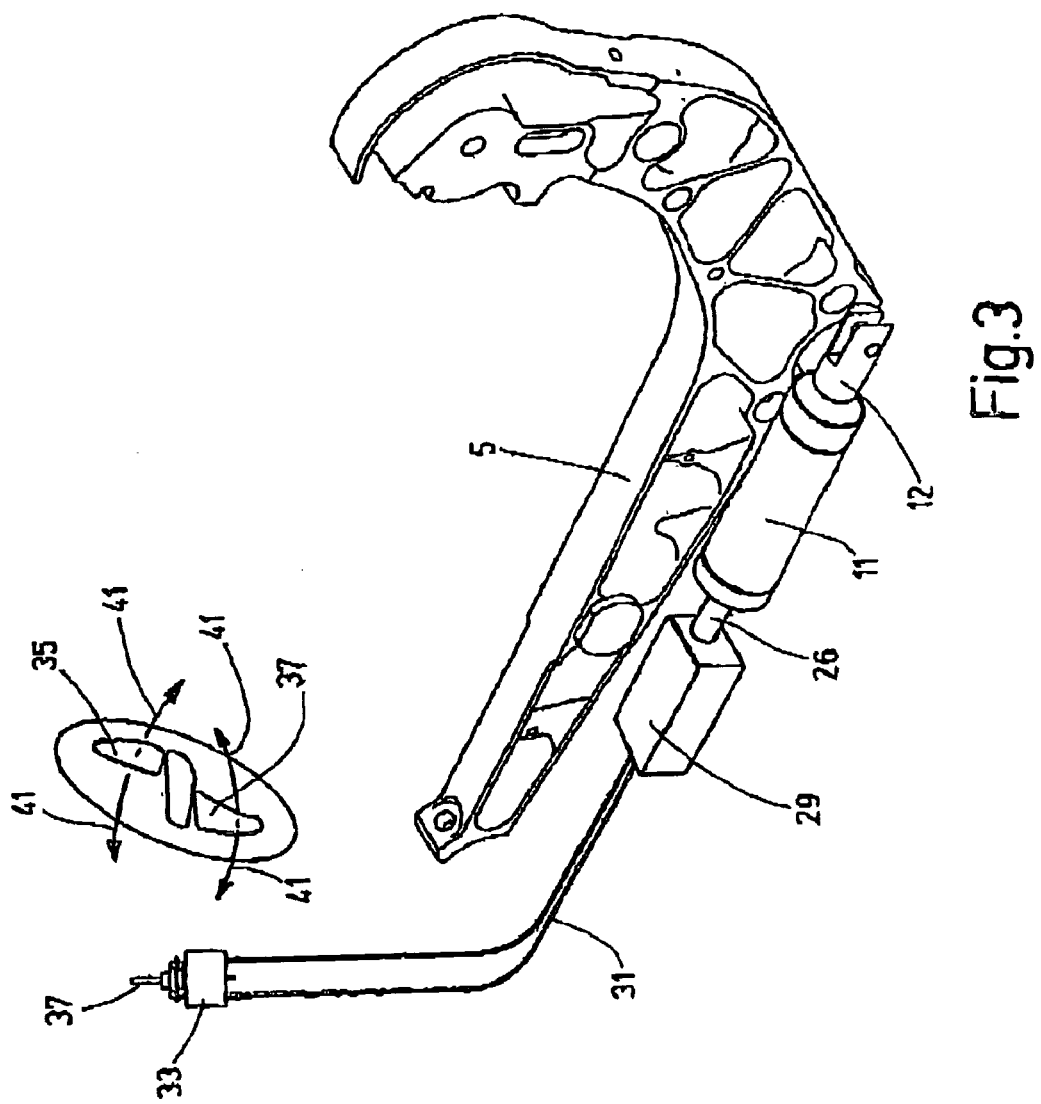
FIG. 3 is a perspective view of a greatly simplified diagram of one lateral support for a backrest tiltably mounted on the support, with the gas-pressure spring system being mounted on the lateral support as an energy accumulator, and manual levers of electric control switches for two servo drives being symbolically indicated according to a third embodiment of the present invention.
Figure 4:
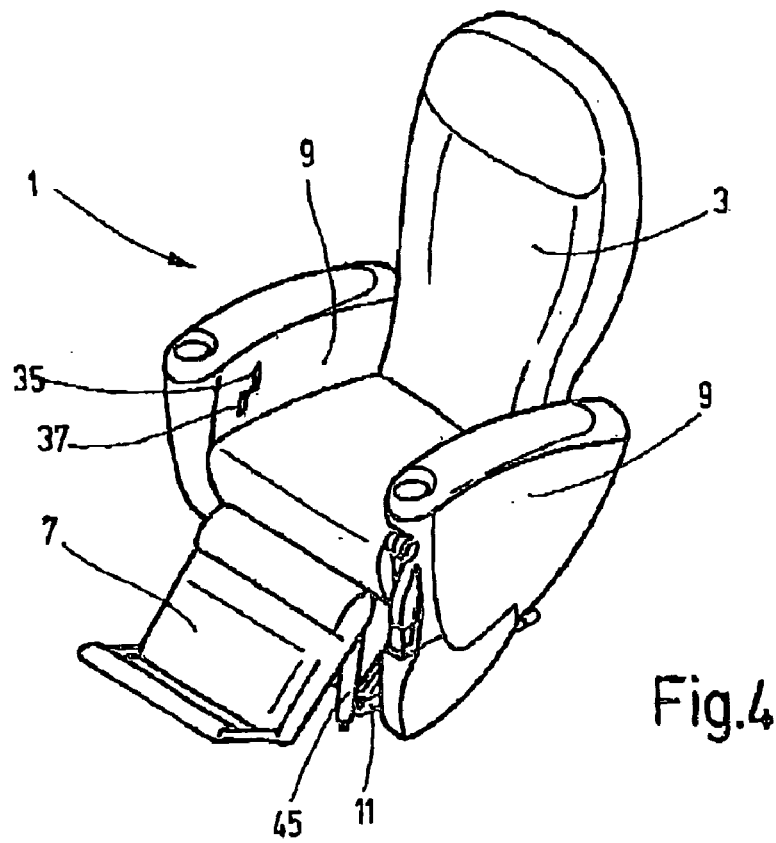
FIG. 4 is a perspective view of an aircraft seat with a tiltable backrest and a tiltable footrest, with a system of manual levers of associated control switches in the armrest according to an embodiment of the present invention.

An aircraft passenger seat 1, in FIG. 4, has a backrest 3 tiltably mounted on lateral supports 5, only one of which, is shown in FIG. 3. The aircraft passenger seat 1 also has an adjustable, tiltably mounted footrest 7. Other main components of the seat 1, are the armrests 9 located adjacent to the seating surface.

In the manner customary for such seats, the adjustable seat parts, that is, in the embodiment illustrated and described as an example here, the backrest 3 and footrest 7, are normally blocked to prevent tilting and are prestressed or biased into an end position by a restoring force provided by an energy accumulator. In the case of the backrest 3, this position is the upright end position prescribed for the landing process of a particular aircraft.

Figure 1:
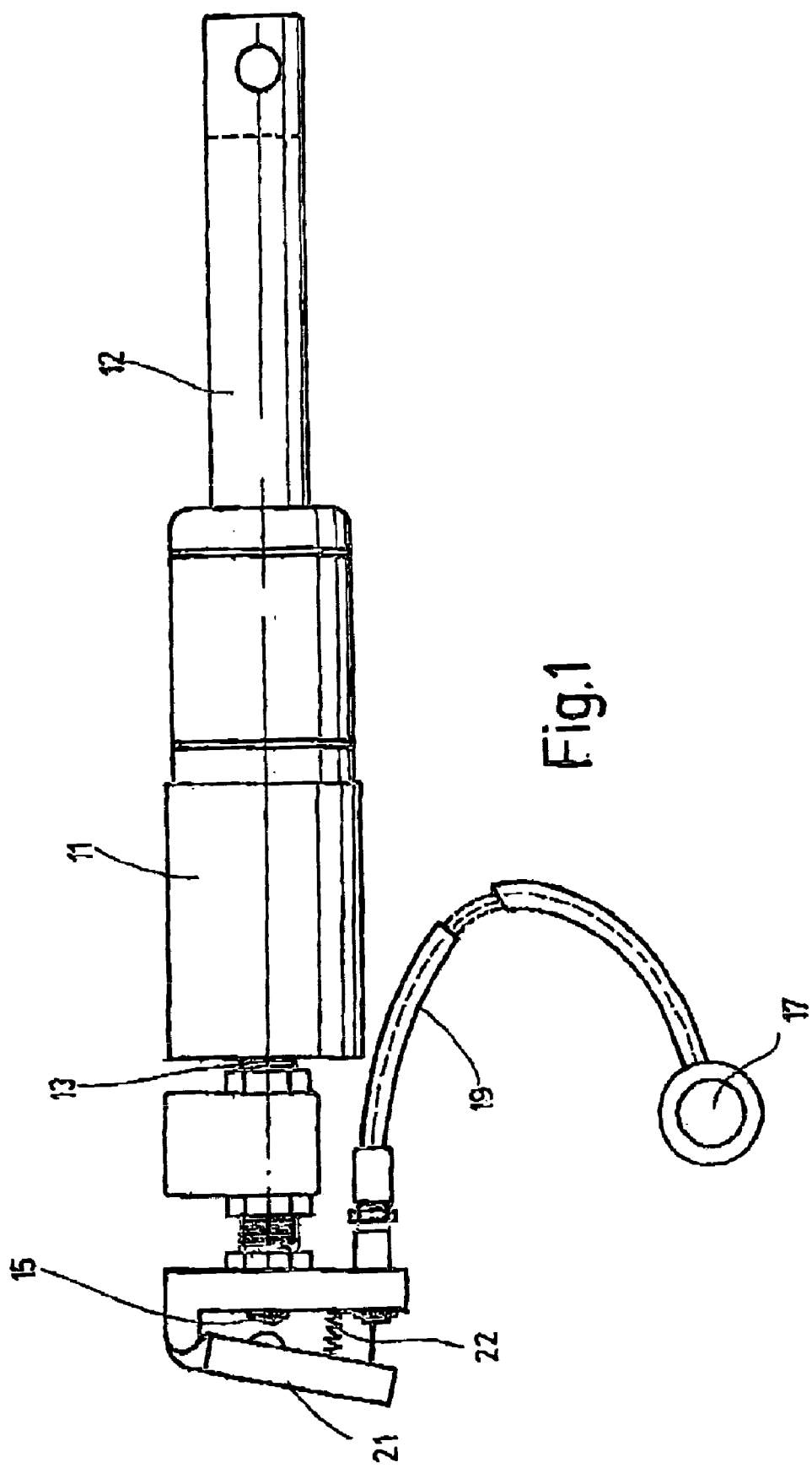
FIG. 1 is a side elevational view of a gas-pressure spring system serving as energy accumulator, with an emergency unlocking device actuated by a manually operated push button, without a servo drive provided, in accordance with a first embodiment of the present invention.
Figure 2:
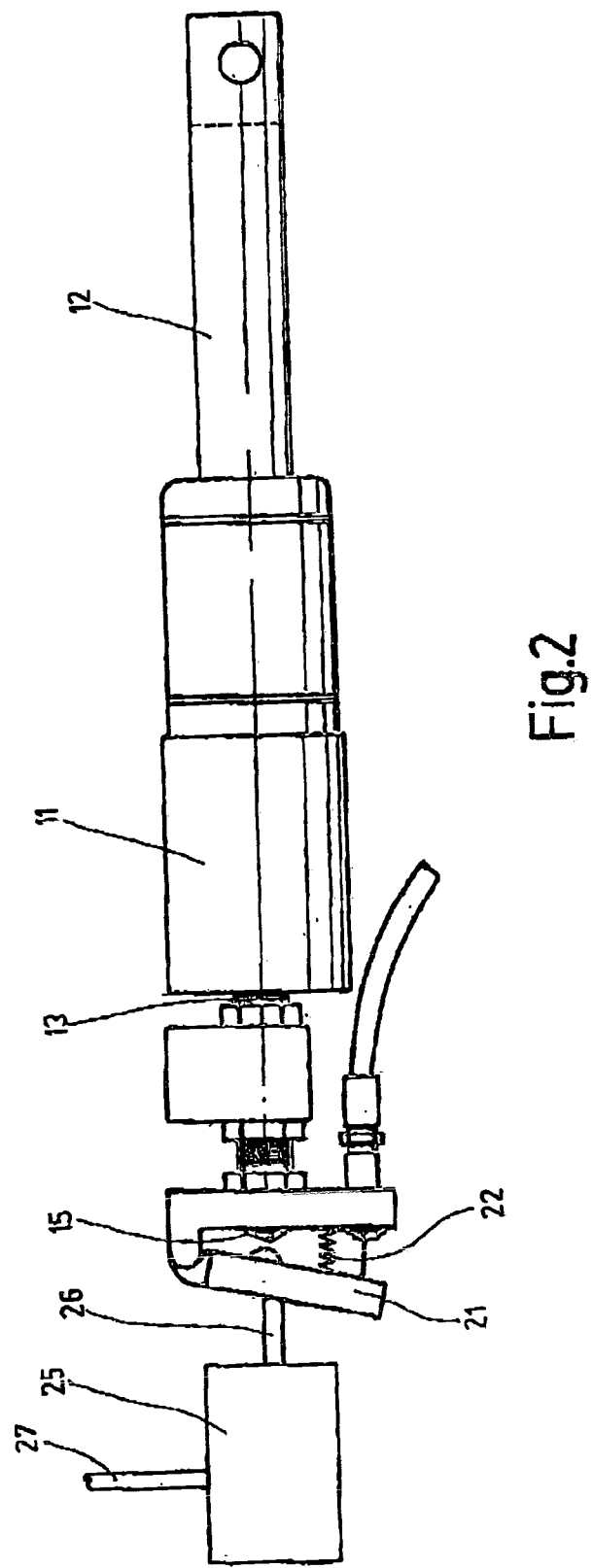
FIG. 2 is a side elevational view of the gas-pressure spring system of FIG. 1 with a servo drive provided, in accordance with a second embodiment of the present invention, with the servo drive being illustrated in simplified diagrammatic form.

FIGS. 1 to 3 illustrate a gas-pressure spring system 11 as an example of an energy accumulator for generation of this restoring force. The restoring force is introduced into the associated seat part by a piston rod 12. The gas-pressure spring system 11 has an integrated locking device, such that the piston rod 12 is normally blocked from axial displacement. The locking device may be transferred to the inoperative state by a control valve 13. The gas-pressure spring system 11 may be unlocked if a tappet 15 of the control valve 13 is actuated (to the right in FIGS. 1 and 2).

FIG. 1 shows a device for manual emergency unlocking. It is possible to transfer, by way of a manually operated push button 17 (FIG. 1) and a Bowden wire system 19, actuating power to a tiltably mounted operating lever 21. Lever 21 strikes the tappet 15 of the control valve 13 against the force of a restoring spring 22 to unlock the gas-pressure spring system 11. The restoring force of the gas-pressure spring system 11 may be utilized to move the respective seat part to its end position.

FIGS. 2 and 3 illustrate the present invention with servo-assisted generation of the actuating power for unlocking the gas-pressure spring system 11 by actuation of the tappet 15 of the control valve 13. As illustrated in FIG. 2, a servo drive 25 has an actuating component 26 by means of which the operating lever 21 may be acted on and pivoted in order to operate the control valve 13 by way of the tappet 15. In the illustration in FIG. 2 the servo drive 25 may be activated by a control connection 27. The control connection includes an electric cable in the case of an electric servo drive or a pipeline in the case of a pneumatic or hydraulic servo drive.

FIG. 3 illustrates an embodiment of an electric servo drive with an electromagnet 29 activated by a cable 31 and a control switch 33. The control switch 33 is connected to the wiring (not shown) of the respective vehicle or aircraft. When the electromagnet 29 is excited, the actuating component 26 is displaced to actuate the control valve 13 by way of the tappet 15 for the purpose of unlocking the gas-pressure spring system 11. When the excitation is discontinued, the actuating component 26, under the influence of the return power inherent in the control valve 13 and of the restoring spring 22 (FIG. 2), is returned to the initial position, so that the gas-pressure spring 11 is again locked.

FIG. 3 presents a symbolic representation of hand levers 35 and 37, of which hand lever 35 is connected to switch actuating component 39 of the control switch 33 for the electromagnet 29 of the servo drive of the backrest 3. The hand lever 37, in turn, is associated with the switch actuating component of the control switch (not shown) for the footrest 7.

The hand levers 35 and 37 are based with respect to shape and positioning to represent the associated adjustable seat part, and may be pivoted back and forth respectively as indicated by the curved arrows 41. In each of these pivoting movements, which are executed against a restoring spring force, the respective control switch, that is, the switch actuating component 39 in the case of the backrest 3, is operated in order to activate the electromagnet, that is, the electromagnet 29 in the case of the backrest. Thus, the user clearly can effect unlocking by tilting the hand lever 35 back or forth in order to move the backrest back or forth.

Figure 5:
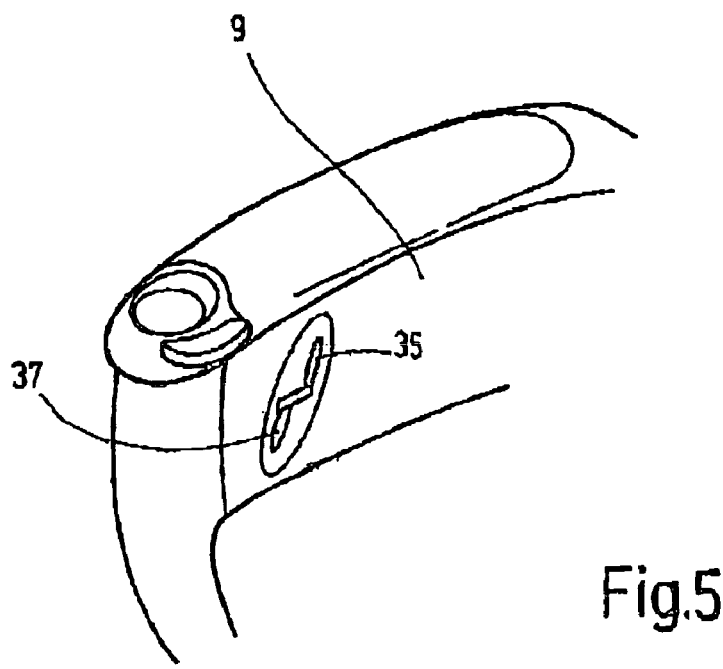
FIG. 5 is a partial perspective view of the armrest FIG. 4 on a larger scale.

FIGS. 4 and 5 illustrate the layout of the hand levers 35 and 37 on the armrest 9 of the seat 1. In addition, FIG. 4 illustrates operation of the gas-pressure spring system 11 associated with the footrest 7 in conjunction with the rod system 45 of the footrest 7. The latter is pretensioned by the restoring force of the gas-pressure spring system 11 for pivoting movement upward. In the event of unlocking by means of the hand lever 37, the footrest 7 assumes its raised position, from which it may be pivoted downward as desired by the seat occupant to be locked in the position desired.

While various embodiments have been chosen to illustrate the invention, it will be understood by those skilled in the art that various changes and modifications can be made therein without departing from the scope of the invention as defined in the appended claims.

What is claimed is:

1. A personal transportation seat, comprising:
   individually adjustable seat parts movable against a restoring force;
   an energy accumulator coupled to and biasing at least one of said seat parts with the restoring force toward a preset position;
   a locking device normally locking said energy accumulator in an operative state of said locking device and being transferable to an inoperative state thereof;
   a switching device operatively connected to said locking device for transferring said locking device to the inoperative state unlocking said energy accumulator to allow the restoring force thereof to act on the respective seat part, said switching device including a servo drive for each of said adjustable seat parts for generating an actuating force to transfer said locking device to the inoperative state; and a manually movable hand lever controlling each said servo drive, each said hand lever having a shape and a position based on an outline of the respective seat part to be adjusted.

2. A personal transportation seat according to claim 1 wherein
said energy accumulator comprises a normally blocked gas-pressure spring system unlockable by a control valve operated by an actuating force produced by the respective servo drive against a return force.

3. A personal transportation seat according to claim 2 wherein
each said servo drive is electrical, and comprises an electromagnet generating the actuating force and a control switch actuated by said hand lever.

4. A personal transportation seat according to claim 1 wherein
said servo drive generates one of hydraulic power and pneumatic power.

5. A personal transportation seat according to claim 1 wherein
said adjustable seat parts comprise at least one of a backrest, leg rest and foot rest; and
each said seat part has an independently operable hand lever.

6. A personal transportation seat according to claim 5 wherein
a spring coupled to each said hand lever biases the respective hand lever toward an initial position thereof.

7. A personal transportation seat according to claim 6 wherein
each said hand lever is mounted on one of the seat, an arm rest of the seat, outside of the seat on an interior vehicle wall, and a control console associated with the seat.

8. A personal transportation seat according to claim 1 wherein
each said hand lever permits two setting movements in opposite directions for the respective seat part.

9. A personal transportation seat according to claim 1 wherein
a manually operated actuating device transfers the locking device to the inoperative state for emergency unlocking said energy accumulator.

10. A personal transportation seat according to claim 9 wherein
said actuating device comprises a Bowden wire mechanically actuating said locking device by a manually operated button.

11. A personal transportation seat, comprising:
individually adjustable seat parts movable against a restoring force;
an energy accumulator coupled to and biasing at least one of said seat parts with the restoring force toward a preset position, said energy accumulator being a normally blocked gas-pressure spring system;
a locking device normally locking said energy accumulator in an operative state of said locking device and being transferable to an inoperative state thereof;
a switching device operatively connected to said locking device for transferring said locking device to the inoperative state unlocking said energy accumulator to allow the restoring force thereof to act on the respective seat part, said switching device including a servo drive for each of said adjustable seat parts for generating an actuating force to transfer said locking device to the inoperative state;
a manually movable hand lever controlling each said servo drive, each said hand lever having a shape and a position based on an outline of the respective seat part to be adjusted;
a control valve operated by an actuating force produced by the respective servo drive against a return force for unlocking said spring system; and
a manually operated actuating device transferring the locking device to the inoperative state for emergency unlocking said energy accumulator.

12. A personal transportation seat according to claim 11 wherein
each said servo drive is electrical, and comprises an electromagnet generating the actuating force and a control switch actuated by said hand lever.

13. A personal transportation seat according to claim 11 wherein
said servo drive generates one of hydraulic power and pneumatic power.

14. A personal transportation seat according to claim 11 wherein
said adjustable seat parts comprise at least one of a backrest, leg rest and foot rest; and
each said seat part has an independently operable hand lever.

15. A personal transportation seat according to claim 14 wherein
a spring coupled to each said hand lever biases the respective hand lever toward an initial position thereof.

16. A personal transportation seat according to claim 15 wherein
each said hand lever is mounted on one of the seat, an arm rest of the seat, outside of the seat on an interior vehicle wall, and a control console associated with the seat.

17. A personal transportation seat according to claim 14 wherein
each said hand lever permits two setting movements in opposite directions for the respective seat part.

18. A personal transportation seat according to claim 11 wherein
said actuating device comprises a Bowden wire mechanically actuating said locking device by a manually operated button.

* * * * *